(12) United States Patent  
Curzi et al.

(10) Patent No.: US 9,965,600 B2  
(45) Date of Patent: May 8, 2018

(54) INCREASED SECURITY USING DYNAMIC WATERMARKING

(71) Applicant: International Business Machines Corporation, Armonk, NY (US)

(72) Inventors: Francesca Curzi, Rome (IT); Giuseppe Longobardi, Castellammare di Stabia (IT)

(73) Assignee: International Business Machines Corporation, Armonk, NY (US)

(*) Notice: Subject to any disclaimer, the term of this patent is extended or adjusted under 35 U.S.C. 154(b) by 45 days.

(21) Appl. No.: 14/828,959

(22) Filed: Aug. 18, 2015

(65) Prior Publication Data

US 2017/0053105 A1    Feb. 23, 2017

(51) Int. Cl.
*G06F 21/16* (2013.01)
*H04L 9/32* (2006.01)
*H04L 29/06* (2006.01)
*G06F 17/30* (2006.01)

(52) U.S. Cl.
CPC ........ *G06F 21/16* (2013.01); *G06F 17/30876* (2013.01); *H04L 63/08* (2013.01); *H04L 63/12* (2013.01)

(58) Field of Classification Search
CPC .................................. H04L 9/32; H04L 63/10
See application file for complete search history.

(56) References Cited

U.S. PATENT DOCUMENTS

| | | | |
|---|---|---|---|
| 8,315,951 B2 | 11/2012 | Krstulich et al. | |
| 2004/0153414 A1* | 8/2004 | Khaishgi | G06Q 10/10 705/58 |
| 2006/0287963 A1 | 12/2006 | Steeves et al. | |
| 2013/0124415 A1* | 5/2013 | Mardikar | G06Q 20/40 705/44 |

(Continued)

FOREIGN PATENT DOCUMENTS

WO    03055128 A1    7/2003

OTHER PUBLICATIONS

Gavini et al., "Lossless Watermarking Technique for Copyright Protection of High Resolution Images", 2014 IEEE Region 10 Symposium, 978-1-4799-2027-3/14, © 2014 IEEE, pp. 73-78.
Jin et al., "Web Pages Tamper-Proof Method Using Virus-Based Watermarking", Department of Computer Science, Central China Normal University, Wuhan 40079, P.R.China, © 2008 IEEE, ICALIP2008, pp. 1012-1015.

(Continued)

*Primary Examiner* — Izunna Okeke
(74) *Attorney, Agent, or Firm* — James H. Mayfield; Maeve M. Carpenter

(57) ABSTRACT

As disclosed herein a method for enabling dynamic watermarking on a client includes determining a negotiated watermarking algorithm that identifies at least one location on a web page for a placed watermark, and initiating a web communication by requesting a web page. The method further includes receiving the web page, and verifying the authenticity of the web page using the negotiated watermarking algorithm. Also disclosed herein is a method for enabling dynamic watermarking on a server which includes determining a negotiated watermarking algorithm that identifies at least one location on a web page for a placed watermark, receiving a request for a web page from a client, and identifying the client. The method further includes creating the requested web page using the negotiated watermarking algorithm providing a generated web page, and providing the generated web page to the client. A computer program product is also disclosed herein.

17 Claims, 6 Drawing Sheets

(56) References Cited

U.S. PATENT DOCUMENTS

2014/0173726 A1 6/2014 Varenhorst
2015/0063625 A1* 3/2015 Martin ............... H04N 1/32325
                                                                               382/100

OTHER PUBLICATIONS

Pandey et al., "Dynamic Watermarking for Prevention Phishing Attack", Dynamic watermarking, Journal of Advanced Computing and Communication Technologies (ISSN: 2347-2804), vol. No. 2 Issue No. 4, Aug. 2014, (ETACICT-2014), pp. 1-4, <http://www.academia.edu/8465951/Dynamic_watermarking>.

Singh et al., "Detection and Prevention of Phishing Attack Using Dynamic Watermarking", Department of Computer Science and Engineering, MNNIT, Allahabad, V.V. Das, G. Thomas, and F. Lumban Gaol (Eds.): AIM 2011, CCIS 147, pp. 132-137, 2011, © Springer-Verlag Berlin Heidelberg 2011.

Sun et al., "An efficient web page watermarking scheme", Department of Computer science and Engineering Shanghai Jiao Tong University, Shanghai, China, 978-1-4244-4520-2/09, © 2009 IEEE, pp. 163-167.

Tai et al., "A Novel Public Digital Watermarking for Still Images Based on Encryption Algorithm", Department of Computer Science National Tsing Hua University, Hsinchu, Taiwan 300, © 2003 IEEE, pp. 264-267.

Zhang et al., "A Fragile Watermarking Scheme Based on Hash Function for Web Pages", 2011 International Conference on Network Computing and Information Security, 978-0-7695-4355-0/11, © 2011 IEEE, DOI: 10.1109/NCIS 2011.91, pp. 417-420.

* cited by examiner

INCREASED SECURITY USING DYNAMIC WATERMARKING

BACKGROUND

The present invention relates to internet security, and more particularly to preventing theft of important information when using the internet.

The Internet is a global system of interconnected computer networks linked by wired, wireless, and optical networking technologies, enabling computing devices to communicate worldwide. The Internet enables users to access an extensive range of information, resources, and services. The internet has enabled the creation of online services such as email, video gaming, movie services, music services, fast food delivery, shopping, banking services, and the like.

In today's fast paced world, immediate access to online services is a convenience that society has come to rely on. For example, an individual can order dinner and have it delivered to his home, check email, pay the utility bills, and order a movie, all in a few minutes. Each task can be completed using a computing device from the comfort of the individual's living room. To perform the previously mentioned activities, the individual may have to log into an online web application associated with each service. Logging in may include providing a user ID and password to verify the individual's identity. Once the identity of the individual has been verified by the online service, the individual can begin using the services provided by the online service.

SUMMARY

As disclosed herein a method for enabling dynamic watermarking on a client includes determining a negotiated watermarking algorithm that identifies at least one location on a web page for a placed watermark, and initiating a web communication by requesting a web page. The method further includes receiving the web page, and verifying the authenticity of the web page using the negotiated watermarking algorithm.

As disclosed herein a method for enabling dynamic watermarking on a server includes determining a negotiated watermarking algorithm that identifies at least one location on a web page for a placed watermark, receiving a request for a web page from a client, and identifying the client. The method further includes generating the requested web page using the negotiated watermarking algorithm, generating a web page, and providing the generated web page to the client.

As disclosed herein, a computer program product for enabling dynamic watermarking. The computer program product includes one or more computer readable storage media and program instructions stored on the one or more computer readable storage media. The program instructions include instructions to determine a negotiated watermarking algorithm that identifies at least one location on a web page for a placed watermark, and initiate a web communication by requesting a web page. The program instruction further include instructions to receive the web page, and verify the authenticity of the web page using the negotiated watermarking algorithm.

DETAILED DESCRIPTION

In the highly computerized society of today, the popularity of the internet continues to grow, driven by ever increasing amounts of online information, commerce, entertainment, and social networking. With the popularity of the internet and online applications, protecting ones personally identifying information (PII) has become a priority for internet users. PII may be, for example, login IDs, passwords, social security numbers, credit card numbers and the like. There are numerous ways an attacker my attempt to obtain PII of an individual, one of which is phishing.

Phishing is an attempt by an attacker to acquire PII by masquerading as a trustworthy entity in an electronic communication. Phishing is may be carried out by email spoofing or instant messaging, and it often directs users to enter details at a fake website whose look and feel is almost identical to the legitimate website. Phishing may be carried out by using some form of technical deception designed to make an invalid link in an email or instant message appear as a link to a legitimate web page. The invalid link may connect to a fake website, and the fake website may contain images and logos similar to the legitimate website.

A digital watermark (hereinafter, a watermark) hides digital information in a noise-tolerant signal (e.g., image, video, or audio data). For example, a watermark may be hidden in an image that is part of a web page. Watermarks may be used to verify the authenticity or integrity of the carrier signal (i.e., verify a web page is authentic). For example, an online baking web page may hide a watermark in an image of the banking logo on the login page, and if a client detects the watermark the page may be assumed to be legitimate. However, it is possible that an attacker may have obtained a copy of the image including the watermark and has included the obtained image on the fake page, rendering the watermark useless for verifying the authenticity of the web page.

It has been determined that using static watermarks on web pages is vulnerable to attack, and there is a need for dynamic watermarking. The embodiments disclosed herein generally address the above-described problems.

Figure 1:
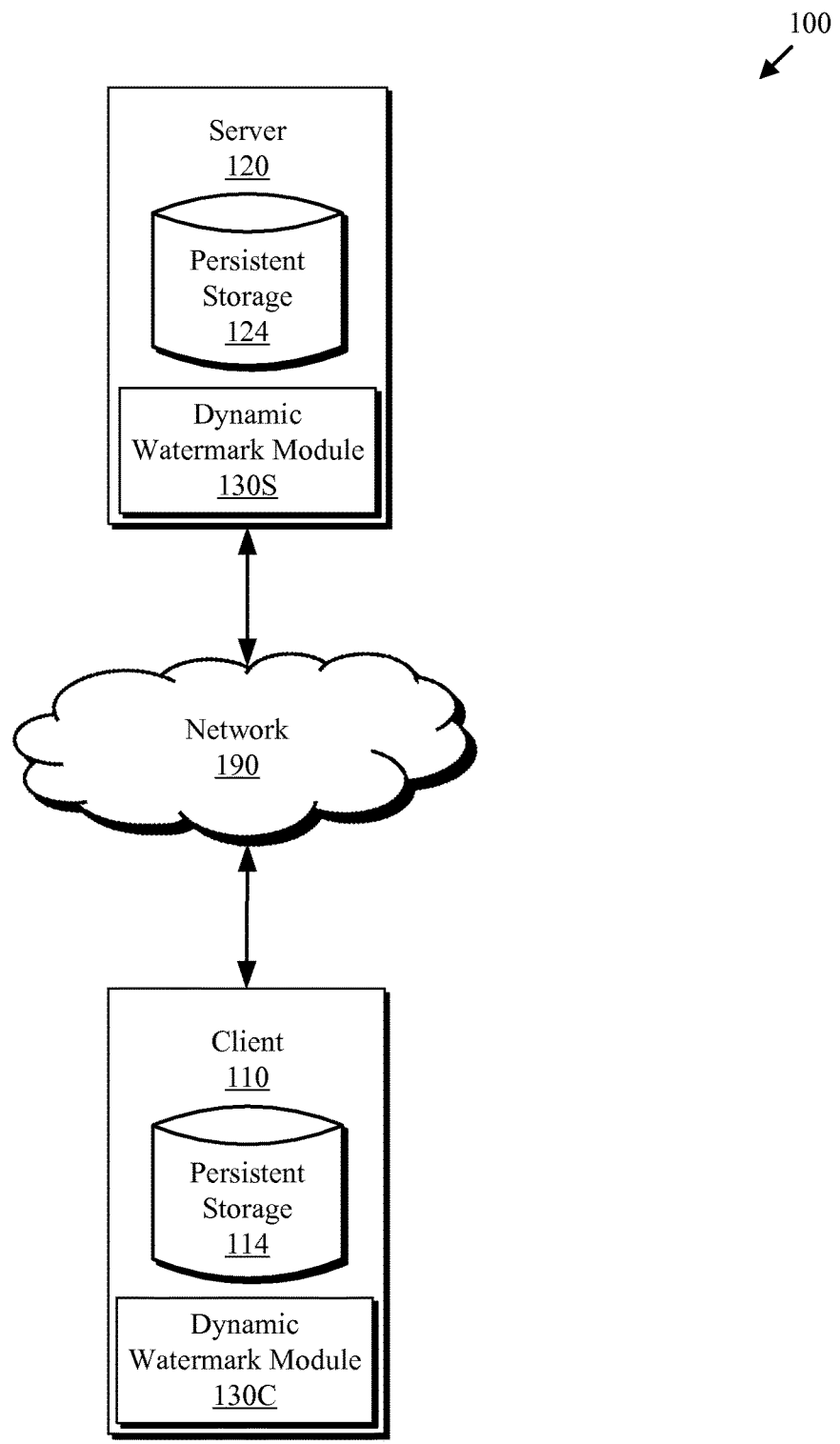
FIG. 1 is a functional block diagram depicting a computing environment in accordance with at least one embodiment of the present invention.

The present invention will now be described in detail with reference to the Figures. FIG. 1 is a functional block diagram depicting a computing environment 100 in accordance with at least one embodiment of the present invention. Computing environment 100 includes client 110 and server 120 which can be smart phones, tablets, desktop computers, laptop computers, specialized computer servers, or any other computer systems, known in the art, capable of communicating over network 190. In general, client 110 and server 120 are representative of any electronic devices, or combination of electronic devices, capable of executing machine-readable program instructions, as described in greater detail with regard to FIG. 6.

As depicted, client 110 includes dynamic watermark module 130C and persistent storage 114. Dynamic watermark module 130C may be configured to negotiate with a web page provider (e.g., server 120) to identify a shared watermarking algorithm that may be used to confirm the authenticity of web pages supplied to client 110 by the web page provider. The shared watermarking algorithm may be stored in persistent storage 114. Additionally, dynamic watermark module 130C may be configured to analyze a received web page to determine if the received web page is authentic (i.e., confirm the page was provided by an expected web page provider). An authentic web page may include a one or more specific images. The images may also include specific watermark content in one or more expected locations, as determined by the shared watermarking algorithm.

As depicted, server 120 includes persistent storage 124 and dynamic watermark module 130S. Dynamic watermark module 130S may be configured to negotiate with a web client (e.g., client 110) to identify a shared watermarking algorithm that may be used to generate web pages. Client 110 may also use the shared watermark algorithm to confirm the authenticity of web pages provided by server 120. The shared watermarking algorithm may be stored in persistent storage 124.

In some embodiments, dynamic watermark module 130S generates a web page using an image stored in an image library. The image from the image library may contain the expected watermark content at the expected location, as determined by the shared watermarking algorithm. In other embodiments, the dynamic watermark module 130S may use an image library and a watermark library to create a watermarked image that will be included on a web page to be provided to client 110. The collection of images and the collection of watermarks may be saved on persistent storage 124 in flat files, databases, or any of various formats familiar to those of skill in the art.

In the depicted embodiment, dynamic watermark module 130 is depicted as client dynamic watermark module 130C and server dynamic watermark module 130S. Dynamic watermark module 130 may work in pairs such as a client and server environment (e.g., 130C and 130S). When working in a client and server environment with dynamic watermark module 130 installed on both client 110 and server 120, the two dynamic watermark module 130 installations (e.g., 130C and 130S) may negotiate (sometimes called a handshake) with each other to determine a negotiated watermarking algorithm.

The handshake to determine the watermarking algorithm may occurred prior to client 110 attempting to initiate a web communication with server 120. The algorithm may be based predetermined logic, for example, the current date and time. Once the handshake has occurred, there may be no need for additional negotiation between client 110 and server 120. After both client 110 and server 120 know the algorithm, server 120 can create dynamic watermark content and determine random locations to place watermarks within images on a web page. The negotiation between the two dynamic watermark module 130 installations may occur over network 190.

In the depicted embodiment, client 110 and server 120 are separate computers, however, in other embodiments, client 110 and server 120 may coexist on a single computer. In yet other embodiments, client 110 and server 120 are procured from a cloud environment.

Persistent storage 114 and 124 may be any non-volatile storage media known in the art. For example, persistent storage 114 and 124 can be implemented with a tape library, optical library, one or more independent hard disk drives, or multiple hard disk drives in a redundant array of independent disks (RAID). Similarly, data on persistent storage 114 and 124 may conform to any suitable storage architecture known in the art, such as a file, a relational database, an object-oriented database, and/or one or more tables.

Client 110, server 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between client 110 and server 120 in accordance with an embodiment of the present invention.

Figure 2:
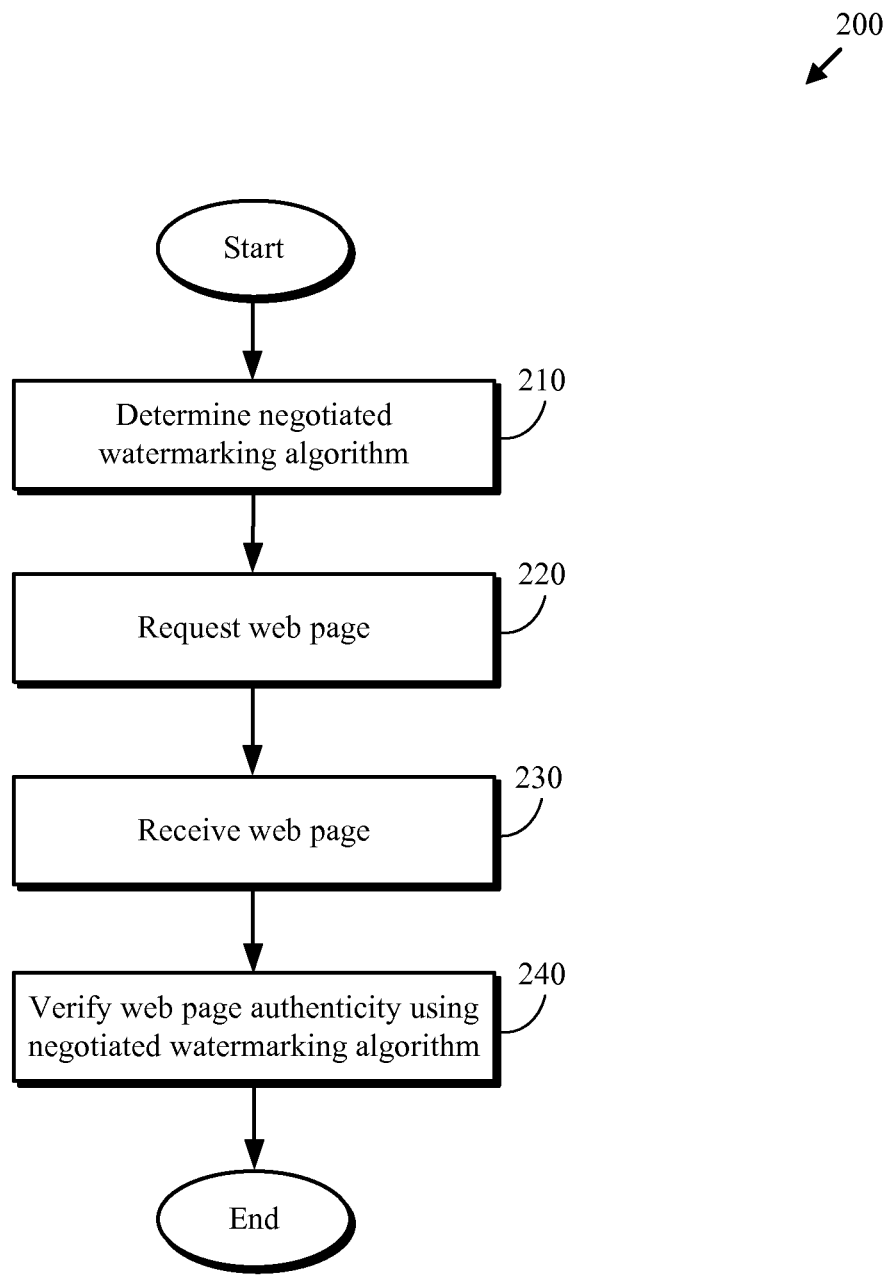
FIG. 2 is a flowchart depicting a client dynamic watermark method, in accordance with at least one embodiment of the present invention.

FIG. 2 is a flowchart depicting a client dynamic watermark method 200, in accordance with at least one embodiment of the present invention. Client dynamic watermark method 200 includes determining (210) a negotiated watermarking algorithm, initiating (220) a web communication, receiving (230) a web page, and verifying (240) a web page authenticity. Client dynamic watermark method 200 enables a web client (e.g., client 110) to verify the authenticity of a web page prior to the web page being rendered.

Determining (210) a negotiated watermarking algorithm may include dynamic watermark module 130C communicating with dynamic watermark module 130S to determine an agreed upon watermarking algorithm that may be used when establishing a web communication (e.g., a web transaction or a web dialog) between client 110 and server 120. The negotiation, sometimes called a handshake, may occur at a time prior to client 110 attempting to initiate a web communication with server 120. The negotiation may result in at least one of: (i) an algorithm for creating dynamic watermark content corresponding the placed watermark; (ii) the number of potential watermark locations on a web page; (iii) the location on the web page of each potential watermark; (iv) the number of placed watermarks on the web page; and (v) the location on the web page of each of the placed watermarks. If the handshake has occurred prior to client 110 attempting to initiate a web communication with server 120, then no additional handshake activity may be required when client 110 initiates a web communication with server 120.

Additionally, dynamic watermark module 130C and dynamic watermark module 130S may negotiate a unique identification code (e.g., a unique key) that dynamic watermark module 130S may use to verify the identity of client 110 when client 110 requests to begin a web communication. In some embodiments, the unique key is the media access control (MAC) address corresponding to the network communications card in the client computer. In other embodiments the key is simply a unique string (e.g., a nick name or user ID) that identifies client 110.

Initiating (220) a web communication may include dynamic watermark module 130C creating and sending a request to a webserver (e.g., server 120). The request may be created as a result of clicking on a link or hot spot in an email, clicking a link on a web page, manually entering a URL in a browser, or any other method familiar to those of skill in the art. Dynamic watermark module 130C may include in the request to server 120 a previously identified key that may enable dynamic watermark module 130S to identify the client making the request.

Receiving (230) a web page may include dynamic watermark module 130C receiving a web page as a result of a request sent during initiating operation 220. The web page may contain client-side scripts (e.g., JavaScript macros) that may enable the web page to, for example, interact with the user, control the browser, communicate asynchronously, and alter the document content that is displayed. It is not uncommon for web hackers to try to hijack web communications and attempt to pose as the expected web page, and steal personal information a user may enter on the web page. Prior to rendering the web page in a browser, dynamic watermark module 130C may wish to verify the authentication of the web page.

Verifying (240) a web page authenticity may include dynamic watermark module 130C using the negotiated watermarking algorithm (i.e., the algorithm agreed upon between dynamic watermark module 130C and dynamic watermark module 130S) to determine the number of watermarks present on the web page, the location on the web page of each of the placed watermarks, and the content of the watermarks. The potential watermark locations may be contained within an image on the requested web page. The number of actual watermarks on the web page (i.e. placed watermarks) may be less than or equal to the number of potential watermark locations that were identified during the negotiation operation.

Dynamic watermark module 130C may verify the web page authenticity by confirming that the expected watermarks are present in the web page. If dynamic watermark module 130C determines that the web page is authentic, the web page is displayed to the user of client 110 and the web communication between client 110 and server 120 continues. However, if dynamic watermark module 130C determines that the web page is not authentic (i.e., the expected watermarks or expected dynamic watermark content is not present on the page), dynamic watermark module 130C may initiate a defensive action to prevent client 110 from rendering (i.e., displaying) or using the fake web page. In some embodiments, when dynamic watermark module 130C detects a fake web page, the web communication is dropped (e.g., terminated). In other embodiments, when dynamic watermark module 130C detects a fake web page, security can be alerted, and the web communication can be transferred to a secure sandbox and allowed to continue while security determines the origin of the fake page.

Figure 3:
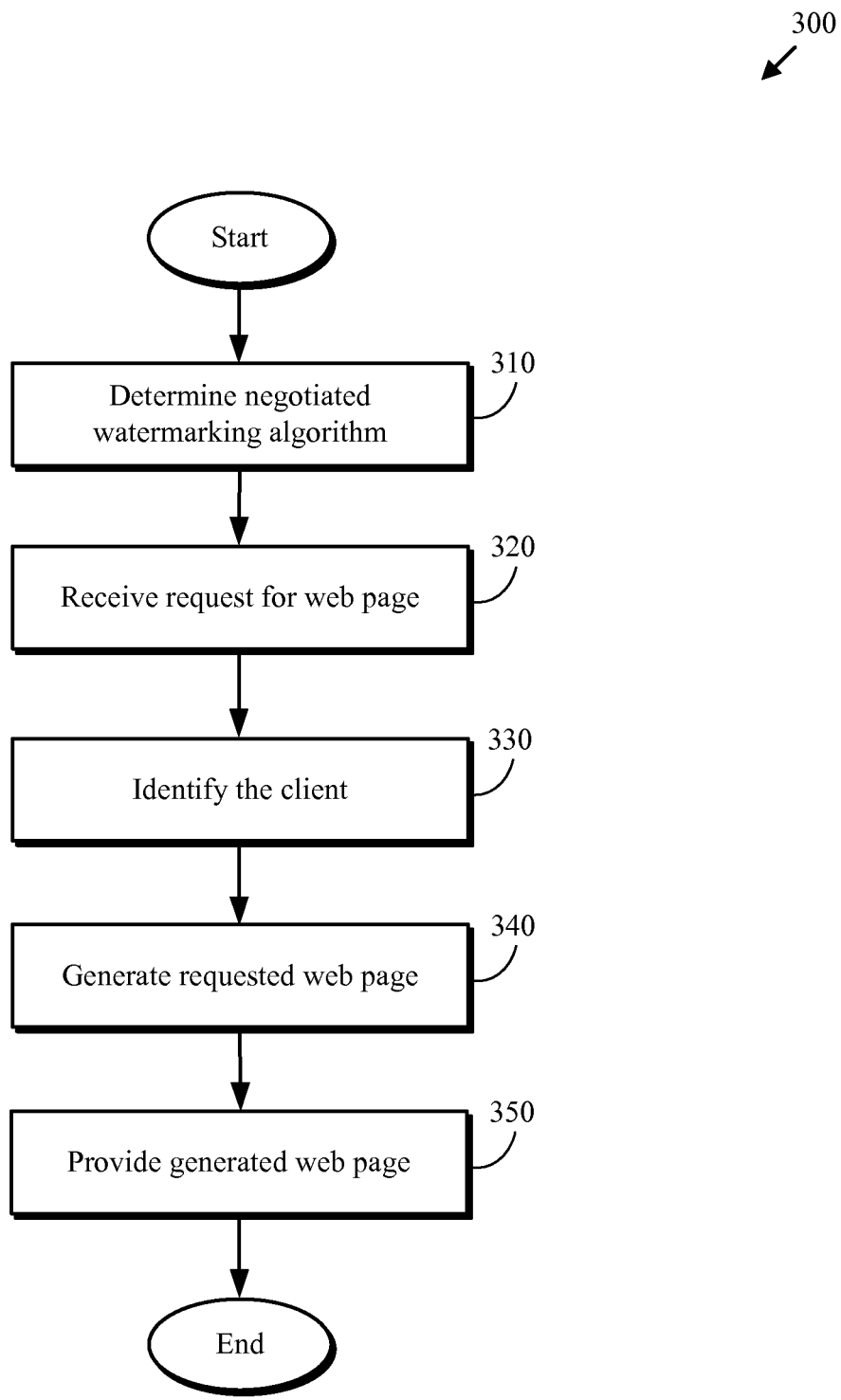
FIG. 3 is a flowchart depicting a server dynamic watermark method, in accordance with at least one embodiment of the present invention.

FIG. 3 is a flowchart depicting a server dynamic watermark method 300, in accordance with at least one embodiment of the present invention. Server dynamic watermark method 300 includes determining (310) a negotiated watermarking algorithm, receiving (320) a request for a web page, identifying (330) the client, generating (340) the requested web page, and providing (350) the generated web page. Server dynamic watermark method 300 enables a web server (e.g., server 120) to identify a client that is requesting a web page, and then generate and provide a web page that the client (e.g., client 110) can verify was provided by server 120.

Determining (310) a negotiated watermarking algorithm may include dynamic watermark module 130S communicating with dynamic watermark module 130C to determine an agreed upon watermarking algorithm to be used when establishing a web communication. The negotiation may occur at a time prior to the initiation of a web communication. The negotiation may result in at least one of: (i) an algorithm for creating dynamic watermark content corresponding a placed watermark; (ii) the number of potential watermark locations on a web page; (iii) the location on the web page of each potential watermark; (iv) the number of placed watermarks on the web page; and (v) the location on the web page of each of the placed watermarks. Additionally, dynamic watermark module 130S and dynamic watermark module 130C may negotiate a unique identification code (e.g., a unique key) that may be provided when client 110 requests to begin a web communication.

Receiving (320) a request for a web page may include dynamic watermark module 130S receiving from a web client (e.g., client 110) a request to begin a web communication. In some embodiments, the request is for a login page to a web application hosted on web server 120. In other embodiments, the request is to display information from a public wiki. In yet other embodiments, client 110 sends server 120 a web page containing watermarks corresponding to the negotiated watermarking algorithm.

Identifying (330) the client may include dynamic watermark module 130S retrieving from the request a unique key that may verify the identity of the client (e.g., client 110) initiating the web communication request. Verifying the identity of the client may enable dynamic watermark module 130S to determine the appropriate negotiated watermarking algorithm to be used when creating the requested web page. In some embodiments, the request is in the form of a web page, and dynamic watermark module 130*s* confirms the authenticity of the request using watermarks and the negotiated watermarking algorithm.

Generating (340) the requested web page may include dynamic watermark module 130S using the appropriate negotiated watermarking algorithm to identify the number of watermarks to be placed on the web page, where the number of watermarks on the page will be less than or equal to the total number of potential watermarks that were identified during the negotiation operation When generating the requested web page, the watermarks identified by the watermarking algorithm may be contained within one or more images on the requested web page. The location and content of the watermarks on resulting generated web page may be dynamic depending on the negotiated watermarking algorithm. In some embodiments, the location of the placed watermarks, with respect to the potential watermarks, is randomly determined based on the initiation time of the request. In other embodiments, the content of the placed watermarks is created using different watermarking algorithms, and the algorithm used is determined based on the initiation date and/or time of the request.

Providing (350) the generated web page may include dynamic watermark module 130S supplying the generated web page to client 110. In some embodiment, dynamic watermark module 130S provides the generated web page to an application hosted on server 120 and the application transmits the generated web page to client 110. In other embodiments, dynamic watermark module 130S transmits the generated web page directly to client 110. Network 190 may be used to transmit the generated web page.

Figure 4:
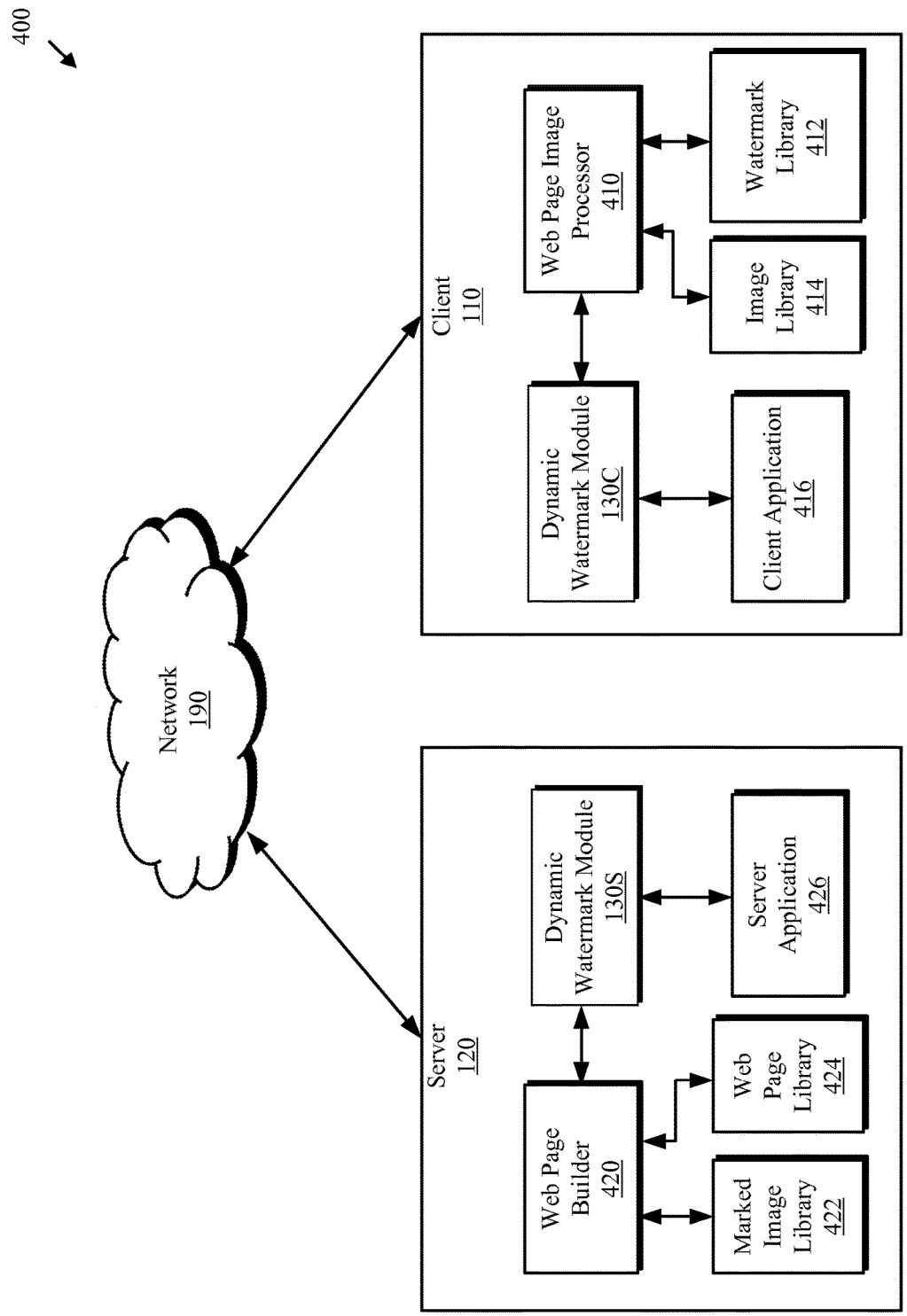
FIG. 4 is a functional block diagram depicting a web environment, in accordance with at least one embodiment of the present invention.

FIG. 4 is a functional block diagram depicting a web environment 400, in accordance with at least one embodiment of the present invention. Exemplary web environment 400 includes client 110 and server 120 that communicate with each other using network 190. To avoid the overhead of generating watermark and inserting the watermarks in an image at execution time, the depicted embodiment uses web pages that are generated using various versions of previously generated images that contain previously generated watermark content.

As depicted, server 120 includes dynamic watermark module 130S (described in FIG. 1), web page builder 420, marked image library 422, web page library 424, and server application 426. Web page library 424 includes previously generated web pages that contain all page content excluding the images corresponding to the page. Marked image library 422 includes a collection of images including watermarks. There may be multiple copies of an image with different watermarks included in the image. In some embodiments, images in marked image library 422 contain one watermark. In other embodiments, images in marked image library 422 contain multiple watermarks. In another embodiment, images in marked image library 422 contain no watermarks.

Server application 426 receives a request, from client 110, for a web page. dynamic Watermark module 130S uses a negotiated watermarking algorithm to identify the correct web page, and determine the appropriate marked images to be placed on the generated page. Web page builder 420 receives, from dynamic watermark module 130S, the specifications for building the requested web page. Web page builder 420 retrieves the correct web page from web page library 424. Web page builder 420 then retrieves the images for the web page from marked image library 422 and generates the requested web page. Server application 426 provides, to client 110, the web page that was generated according to the negotiated watermarking algorithm.

As depicted, client 110 includes dynamic watermark module 130C (described in FIG. 1), web page image processor 410, watermark library 412, image library 414, and client application 416. Image library 414 may include a collection of images corresponding to web pages that may be received from server 120. The images contained in image library 414 do not include any watermarks. Watermark library 412 may include a collection of previously generated watermarks corresponding to a negotiated watermarking algorithm. The previously generated watermarks may correspond to the watermarks included in images in marked image library 422.

Client application 416 initiates a web communication with server 120 by requesting a web page from server 120. When client application 416 receives the requested web page, dynamic watermark module 130C uses a negotiated watermarking algorithm to validate the authenticity of the web page. Dynamic watermark module 130C provides web page image processor 410 with the specifications of the expected image and watermark combinations as identified using the negotiated watermarking algorithm. Web page image processor 410 retrieves the appropriate image(s) from image library 414 and the appropriate watermark(s) from watermark library 412. Web page image processor 410 then generates the expected image(s) and watermark combinations according to the provided specification.

Dynamic watermark module 130C extracts the watermark(s) and compares the expected image(s) content with the image(s) contained in the received web page. In some embodiments, when the expected image(s) and the image(s) on the received web page are the same, dynamic watermark module 130C allows client application 416 to render the received web. In other embodiments, when the expected image(s) and the image(s) on the received web page do not match, dynamic watermark module 130C provides client application 416 with a warning message indicating the web page is not authentic and ends the web communication.

Figure 5:
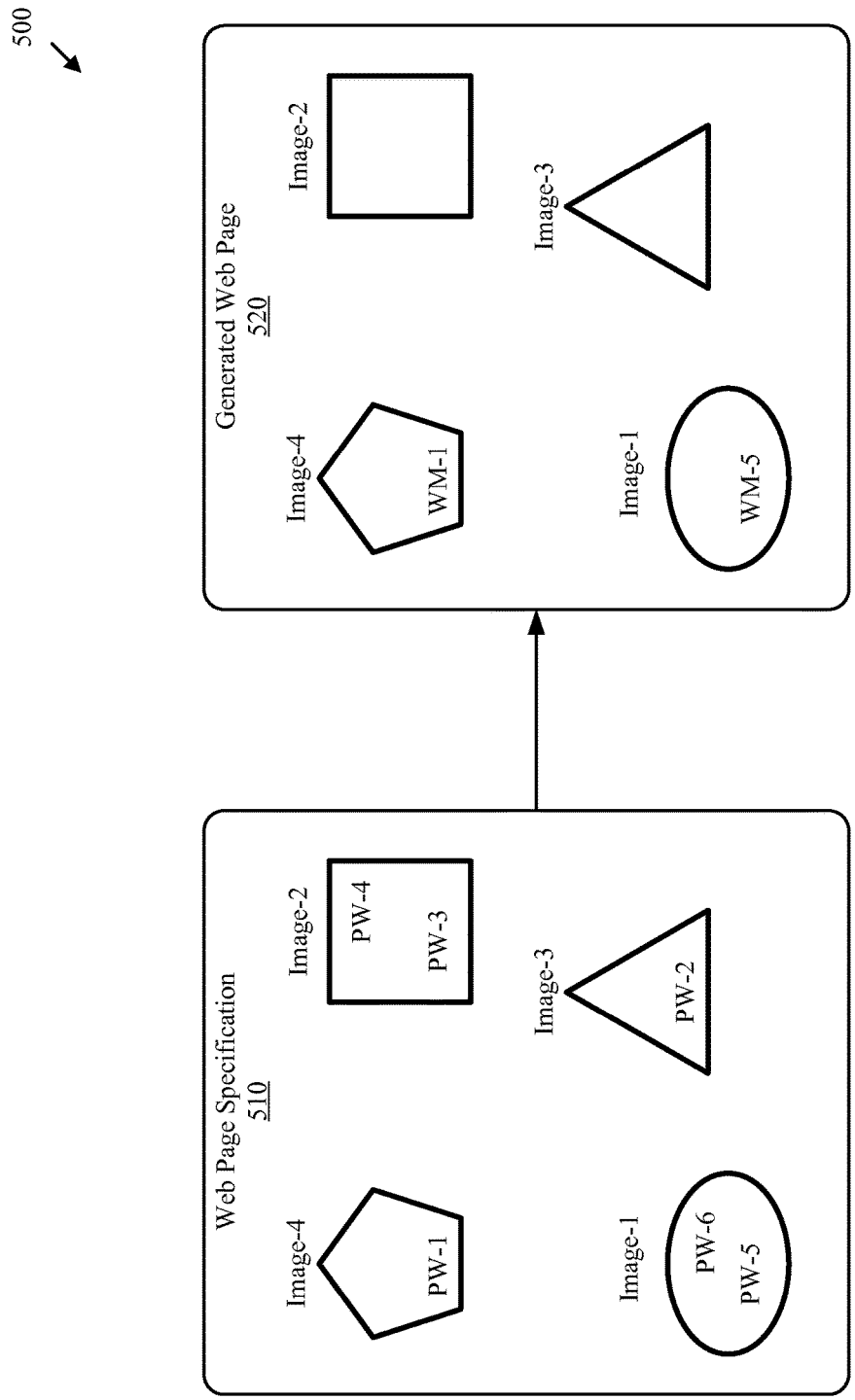
FIG. 5 depicts an example of a web page, in accordance with at least one embodiment of the present invention.

FIG. 5 depicts example web page 500, in accordance with at least one embodiment of the present invention. As depicted, example web page 500 includes web page specification 510 and generated web page 520. Web page specification 510 may include one or more images (e.g., image-1, image-2, image-3, and image-4). Each image may include one or more potential watermark locations (e.g., PW-1, PW-2, PW-3, PW-4, PW-5, and PW-6). In the depicted embodiment, each image contains at least one potential watermark location, however, there may be images in a web page specification that contain no potential watermark locations.

As depicted, generated web page 520 is an example of a web page generated using web page specification 510. After applying a negotiated watermarking algorithm, generated web page 520 still contains image-1, image-2, image-3, and image-4, however, the negotiated watermarking algorithm determined that watermarks were to be placed in locations PW-1 and PW-5. Generated web page 520 depicts locations PW-1 and PW-5 containing watermarks WM-1 and WM-5 respectively. Additionally potential watermark locations PM-2, PM-3, PM-4, and PM-6 may contain no watermarks, or may contain useless watermarks.

Figure 6:
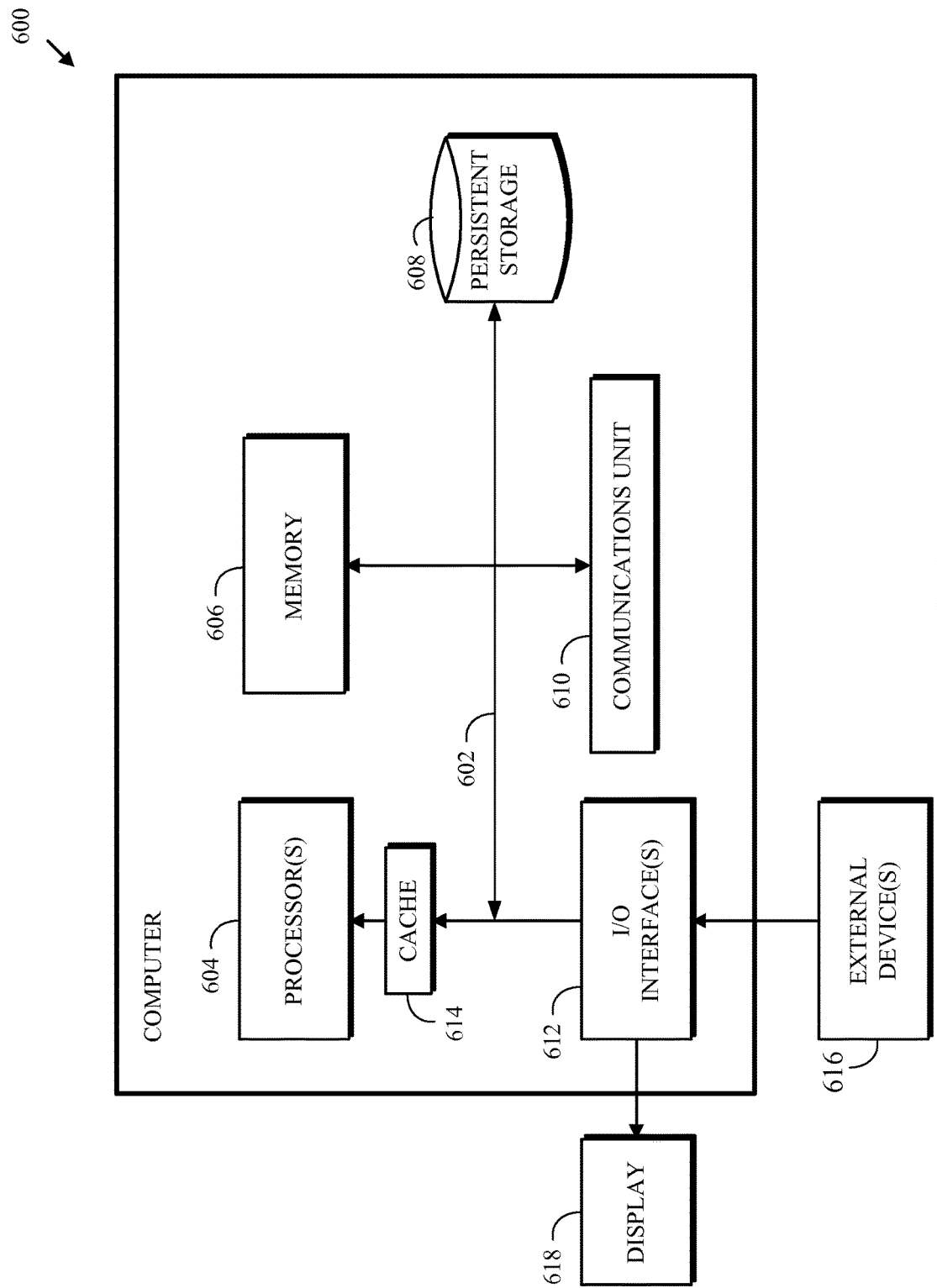
FIG. 6 is a functional block diagram depicting various components of one embodiment of a computer suitable for executing the methods disclosed herein.

FIG. 6 depicts a block diagram of components of a computer system 600, which is an example of systems such as client 110 and server 120 within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Client 110 and server 120 include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., client dynamic watermark method 200 and server dynamic watermark method 300 are stored in persistent storage 608 for execution and/or access by one or more of the respective processor(s) 604 via cache 614. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of client 110 and server 120. In these examples, communications unit 610 includes one or more network interface cards. Communications unit 610 may provide communications through the use of either or both physical and wireless communications links. Program instructions and data used to practice embodiments of client dynamic watermark method 200 and server dynamic watermark method 300 may be downloaded to persistent storage 608 through communications unit 610.

I/O interface(s) 612 allows for input and output of data with other devices that may be connected to each computer system. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a negotiated watermarking algorithm that identifies at least one location on a web page for a placed dynamic watermark, wherein the placed dynamic watermark comprises digital information hidden in a noise-tolerant medium such that the digital information is hidden from a user's perception, wherein the at least one location varies based on the negotiated watermarking algorithm determined for each initiated web communication, and wherein the negotiated watermarking algorithm identifies at least one of:
   an algorithm for creating the digital information corresponding to the placed dynamic watermark;
   a number of potential watermark locations on the web page;
   a location on the web page of each potential watermark;
   a number of placed dynamic watermarks on the web page; and
   a location on the web page of each of the placed dynamic watermarks;
   requesting the web page;
   receiving the web page; and
   verifying the authenticity of the web page using the negotiated watermarking algorithm prior to displaying of the web page.

2. The method of claim 1 further comprising negotiating a unique key that identifies a client.

3. The method of claim 2, wherein requesting the web page comprises providing the unique key in a request for the web page.

4. The method of claim 1, wherein a potential dynamic watermark location is contained within an image on the requested web page.

5. The method of claim 1, wherein a number of placed dynamic watermarks on the web page is less than or equal to a number of potential watermark locations.

6. The method of claim 1, wherein verifying the web page authenticity comprises comparing a value of the placed dynamic watermark with an expected value for the placed dynamic watermark.

7. The method of claim 1, further comprising continuing a web communication if the web page is determined to be authentic.

8. The method of claim 1, further comprising initiating a defensive action if the web page is not authentic.

9. A method comprising:
   determining a negotiated watermarking algorithm that identifies at least one location on a web page for a placed dynamic watermark, wherein the placed dynamic watermark comprises digital information hidden in a noise-tolerant medium such that the digital information is hidden from a user's perception, and wherein the negotiated watermarking algorithm identifies at least one of:
   an algorithm for creating the digital information corresponding to the placed dynamic watermark;
   a number of potential watermark locations on the web page;
   a location on the web page of each potential watermark;
   a number of placed dynamic watermarks on the web page; and
   a location on the web page of each of the placed dynamic watermarks;
   receiving, from a client, a request for a web page;
   identifying the client;
   generating the requested web page using the negotiated watermarking algorithm providing a generated web page; and
   providing the generated web page to the client.

10. The method of claim 9, further comprising negotiating a unique key that identifies the client.

11. The method of claim 10, wherein identifying the client comprises receiving the unique key in the request for the web page.

12. The method of claim 9, wherein a potential watermark location is contained within an image on the requested web page.

13. The method of claim 9, wherein a number of placed dynamic watermarks on the web page is less than or equal to a number of potential watermark locations.

14. A computer program product comprising:
   one or more computer readable storage media and program instructions stored on the one or more computer readable storage media, the program instructions comprising instructions to:
   determine a negotiated watermarking algorithm that identifies at least one location on a web page for a placed dynamic watermark, wherein the placed dynamic watermark comprises digital information hidden in a noise-tolerant medium such that the digital information is hidden from a user's perception, wherein the at least one location varies based on the negotiated watermarking algorithm determined for each initiated web communication, and wherein the negotiated watermarking algorithm identifies at least one of:
   an algorithm for creating the digital information corresponding to the placed dynamic watermark;

a number of potential watermark locations on the web page;
   a location on the web page of each potential watermark;
   a number of placed dynamic watermarks on the web page; and
   a location on the web page of each of the placed dynamic watermarks;
request the web page;
receive the web page; and
verify the authenticity of the web page using the negotiated watermarking algorithm prior to displaying of the web page.

15. The computer program product of claim 14, wherein a potential watermark location is contained within an image on the requested web page.

16. The computer program product of claim 14, wherein verifying the web page authenticity comprises comparing a value of the placed dynamic watermark with an expected value for the placed dynamic watermark.

17. The computer program product of claim 14, wherein the program instructions contain instructions to initiate a defensive action if the web page is not authentic.

\* \* \* \* \*